United States Patent
Chiang

(10) Patent No.: US 8,274,748 B1
(45) Date of Patent: Sep. 25, 2012

(54) LENS ACTUATOR

(75) Inventor: Shun-Fan Chiang, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/166,793

(22) Filed: Jun. 22, 2011

(30) Foreign Application Priority Data

May 17, 2011 (TW) .............................. 100117291 A

(51) Int. Cl.
G02B 7/02 (2006.01)
H02K 41/03 (2006.01)

(52) U.S. Cl. ..... 359/824; 359/814; 359/823; 310/12.16; 396/55; 396/133; 348/208.4

(58) Field of Classification Search .......... 359/822–824, 359/814, 554, 557, 695, 696; 310/12.16, 310/12.19, 12.24, 12.27, 14; 396/55, 439; 348/208.2, 208.4; 369/44.22
See application file for complete search history.

(56) References Cited

U.S. PATENT DOCUMENTS

| | | | | |
|---|---|---|---|---|
| 7,291,942 B2* | 11/2007 | Osaka | ........................ | 310/12.04 |
| 7,612,957 B1* | 11/2009 | Wu et al. | ........................ | 359/824 |
| 7,764,450 B2* | 7/2010 | Chou et al. | ..................... | 359/824 |
| 7,871,207 B2* | 1/2011 | Akabane et al. | .............. | 396/439 |
| 7,916,413 B2* | 3/2011 | Liao | ............................ | 359/824 |
| 7,986,478 B2* | 7/2011 | Yamashita et al. | ............ | 359/824 |
| 7,986,873 B2* | 7/2011 | Ishihara et al. | ................. | 396/55 |
| 7,995,289 B2* | 8/2011 | Akabane et al. | .............. | 359/696 |
| 8,009,371 B2* | 8/2011 | Sue et al. | ........................ | 359/824 |
| 8,224,169 B2* | 7/2012 | Tsuruta et al. | .................. | 396/55 |

* cited by examiner

Primary Examiner — Loha Ben
(74) Attorney, Agent, or Firm — Altis Law Group, Inc.

(57) ABSTRACT

A lens actuator includes a housing, a loading plate, a moving unit, four magnetic elements, and an elastic plate. The housing and the loading plate cooperatively form an accommodating room. The housing includes a top panel having four fixing portions. The moving unit is movably received in the accommodating room. The four magnetic elements are received in the accommodating room around the moving unit, and are fixed on four inner sidewalls of the housing. The elastic plate is disposed between the top panel and the moving unit, and the four fixing portions of the housing firmly press the elastic plate on the four magnetic elements.

8 Claims, 4 Drawing Sheets

LENS ACTUATOR

BACKGROUND

1. Technical Field

The present disclosure relates to lens actuators, and particularly, to a voice coil motor type lens actuator.

2. Description of Related Art

Variable focal length lenses are widely used in optical systems. Optical systems incorporating such lenses can, for example, provide focused images of objects at varying distances without adjusting the distance between the lens and the image plane. Variable focal length lenses can also be used in optical systems that provide varying magnification without changing the lenses. Generally, the optical system usually includes an actuator, such as a step motor, to drive the lenses. However, the step motor is relatively large in volume. Use of the step motor requires a significant amount of space for movement of the lenses, which makes the optical system bulky.

Therefore, it is desirable to provide a lens actuator that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
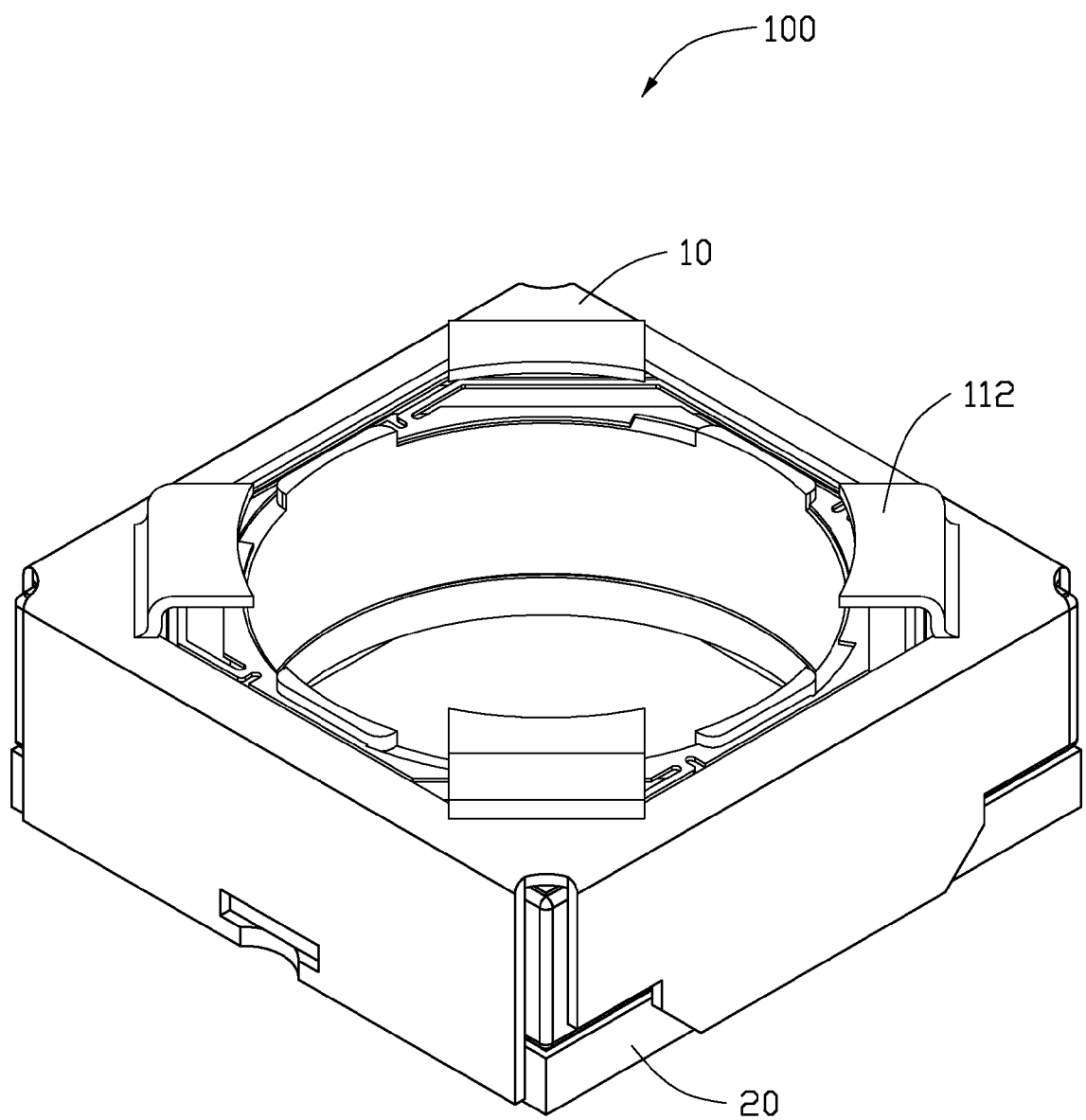
FIG. 1 is a schematic view of a lens actuator, according to an exemplary embodiment.
Figure 2:
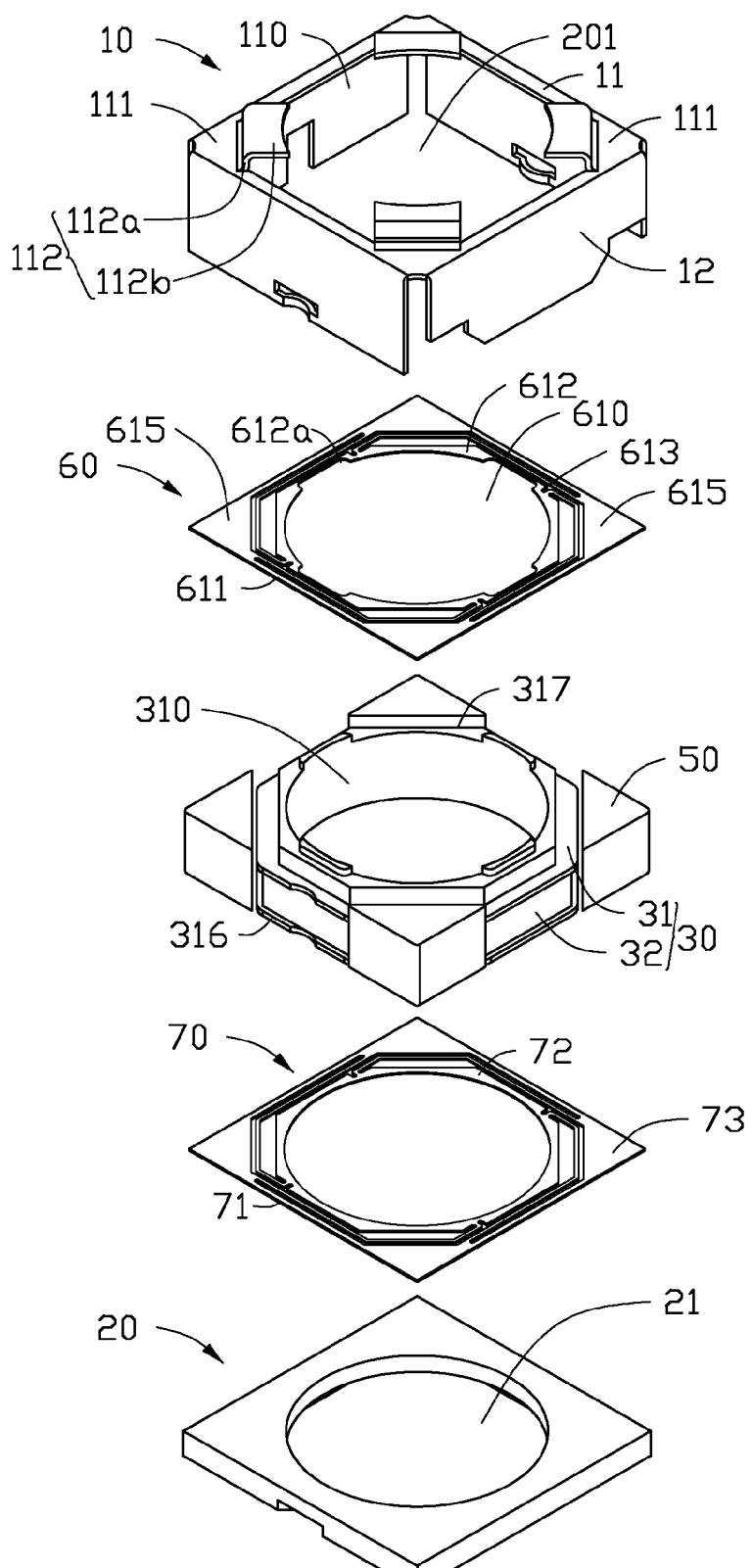
FIG. 2 is an exploded view of the lens actuator of FIG. 1.

Referring to FIG. 1 and FIG. 2, a lens actuator 100, according to an embodiment, includes a housing 10, a loading plate 20, a movable unit 30, four magnetic elements 50, a first resilient plate 60, and a second resilient plate 70.

The housing 10 includes a square-shaped top panel 11, four peripheral panels 12 perpendicular to the top panel 11. The top panel 11 defines a first through hole 110 at the center thereof. The top panel 11 includes four first fixing portions 111 at four corners thereof. The housing 10 is made of material which can be attracted by the magnetic elements 50, such as nickel alloy, iron alloy et al.

Four protrusions 112 are disposed on the top panel 11 around the first through hole 110. Each of the four protrusions 112 is substantially L-shaped, and includes a connecting portion 112a and a bent portion 112b. The connecting portion 112a is perpendicularly disposed on the top panel 11 adjacent to the first through hole 110, and forms an acute angle with a side of the top panel 11. The bent portion 112b is perpendicular to the connecting portion 112a, and extends towards the center of the first through hole 110. In this embodiment, the acute angle is approximately 45 degrees.

The loading plate 20 is substantially square-shaped, and the area of the loading plate 20 is slightly less than that of the top panel 11, and thus the housing 10 can cover the loading plate 20 to form a first accommodating room 201. The center of the loading plate 20 defines a second through hole 21 coaxial with the first through hole 110, and thus light rays can pass through the loading plate 20.

Figure 3:
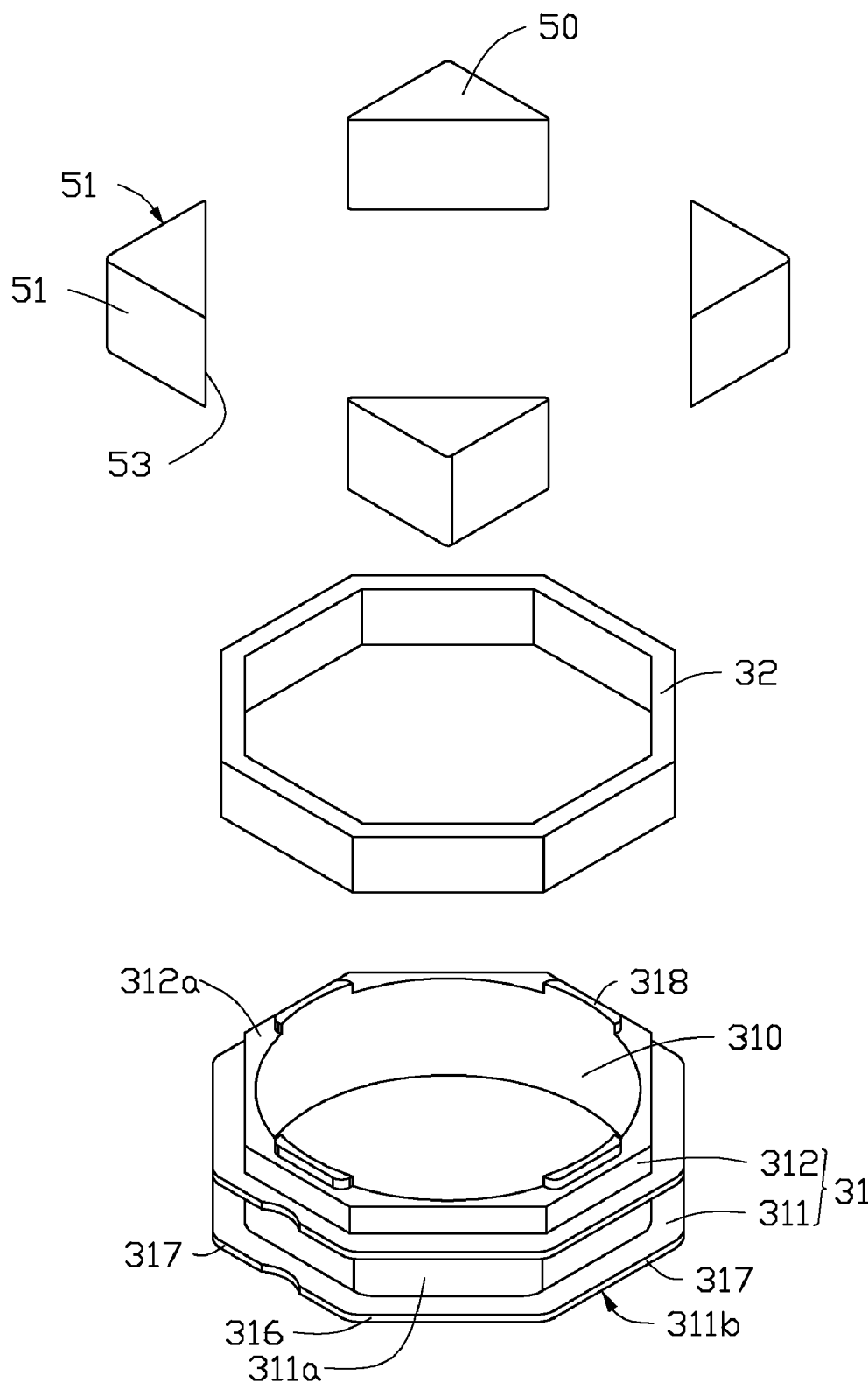
FIG. 3 is an exploded view of a movable unit and a magnetic element of the lens actuator of FIG. 1.
Figure 4:
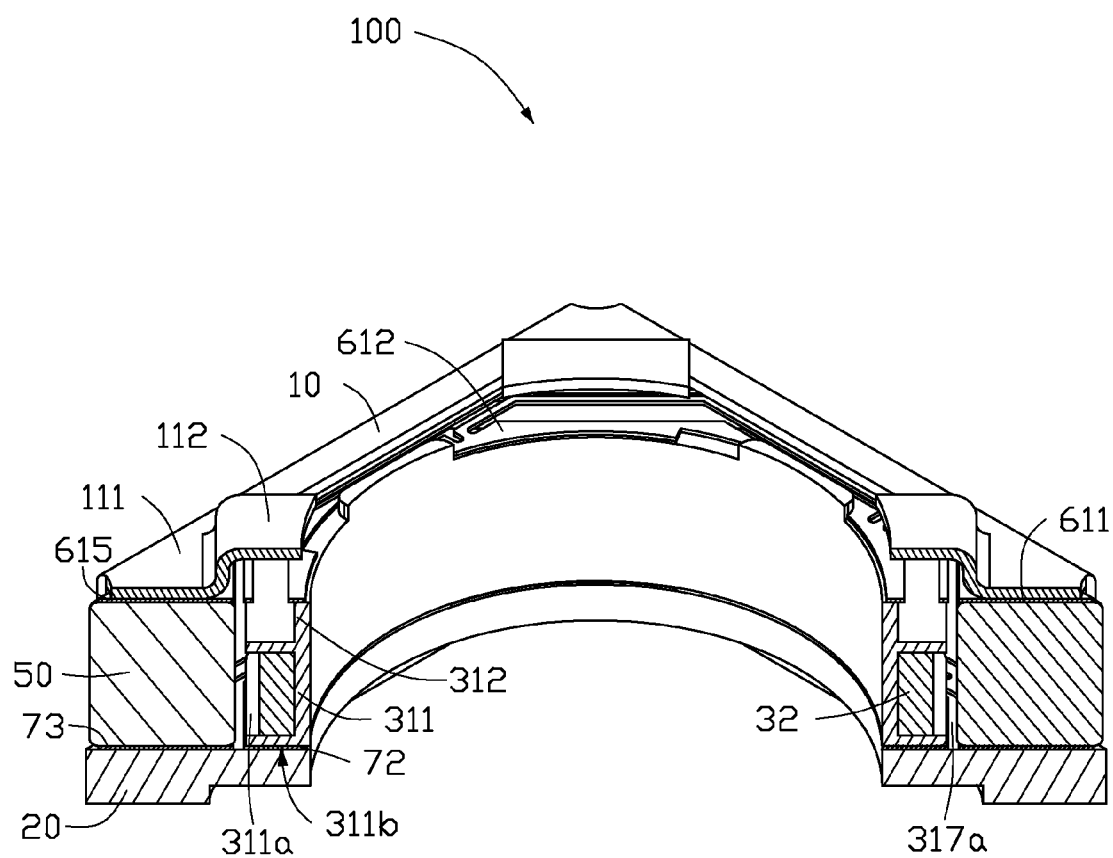
FIG. 4 is a cross-sectional view of the lens actuator of FIG. 1.

The movable unit 30 is accommodated in the first accommodating room 201 and may be movable relative to the housing 10. The movable unit 30 includes a movable barrel 31 and a coil 32. The movable barrel 31 defines a second accommodating room 310 for accommodating the lenses and the filters (not shown). The second accommodating room 310 is a through hole. Also referring to FIG. 3, the movable barrel 31 includes a base 311 adjacent to the loading plate 20 and a convex stage 312 adjacent to the top panel 11. Both the base 311 and the convex stage 312 are substantially octahedral-shaped. The inradius of the convex stage 312 is less than that of the base 311. An outer periphery sidewall of the base 311 defines an encompassing groove 311a. The coil 32 is wrapped around the outer periphery wall of the movable barrel 31, and is received in the encompassing groove 311a. The outer periphery sidewall of the base 311 includes four lateral surfaces 316 respectively parallel to the four peripheral panels 12 and four inclined connecting surfaces 317. Each connecting surface 317 connects to two adjacent lateral surfaces 316. Four receiving spaces 317a are formed between the four connecting surfaces 317 and the inner sidewalls of the housing 10. The base 311 further includes a bottom surface 311b facing the loading plate 20. The convex stage 312 includes a top surface 312a facing the top panel 11. Four locating pins 318 are respectively vertically protruding from the top surface 312a around the second accommodating room 310. The locating pins 318 locate and fasten the movable barrel 31 to the first resilient plate 60.

The four magnetic elements 50 are received in the four receiving spaces 317a respectively to surround the movable barrel 31. Each of the four magnetic elements 50 is substantially triangular prism in shape, and includes two vertical surfaces 51 and an inclined surface 53 connecting to the two vertical surfaces 51. The two vertical surfaces 51 are attracted by the inner surfaces of the housing 10. The inclined surface 53 opposes the corresponding connecting surface 317, a distance formed between the inclined surface 53 and the connecting surface 317, and thus the movable barrel 31 can move relative to the magnetic elements 50 along the axial direction of the second accommodating room 310. The height of each magnetic element 50 along the axial direction of the second accommodating room 310 is slightly less than the distance between the top plane 11 and the loading plate 20. In this embodiment, the magnetic element 50 is a magnet.

Referring to FIG. 2, the first resilient plate 60 is substantially square in shape, and defines a third through hole 610 at the center thereof. The third through hole 610 is coaxial with the first through hole 110, and allows light to pass therethrough. The first resilient plate 60 includes an outer closed-loop frame 611, an inner closed-loop frame 612 concentric with and surrounded by the outer closed-loop frame 611, and a plurality of spring parts 613 interconnected between the outer closed-loop frame 611 and the inner closed-loop frame 612. The outer closed-loop frame 611 includes four second fixing portions 615 disposed on the four corners thereof respectively and corresponding to the four first fixing portions 111. Each of the four first fixing portions 111 is pressed on a corresponding second fixing portion 615 by a corresponding magnetic element 50 and cannot effect the movement of the spring parts 613 along the axial direction of the first accommodating room 201. Each second fixing portion 615 also can be respectively glued (i.e., adhesively mounted) to the top panel 11 and the corresponding magnetic element 50.

The inner closed-loop frame 612 defines four locating holes 612a respectively corresponding to the locating pins 318. The locating holes 612a are communicating with the third through hole 610. The locating holes 612a are used for working with the locating pins 318 to locate and fasten the first resilient plate 60 to the movable barrel 31 by receiving an amount of adhesive. In other embodiments, the locating holes 612a also cannot communicate with the third through hole 610.

The shape of the second resilient plate 70 is substantially the same as that of the first resilient plate 60. The second resilient plate 70 includes a second outer closed-loop frame 71, a second inner closed-loop frame 72 is concentric with and is surrounded by the outer closed-loop frame 71. Because the bottom surface 311b does not protrude from the locating pins, the second inner closed-loop frame 72, does not need locating holes. The second outer closed-loop frame 72 includes four third fixing portions 73 at four corners thereof. The four third fixing portions 73 are pressed on the loading plate 20 by the corresponding magnetic elements 50. The second inner closed-loop frame 72 is fixed on the bottom surface 311b of the movable barrel 31. The third fixing portions 73 also can be respectively glued (i.e., adhesively mounted) to the loading plate 20 and the corresponding magnetic elements 50. The second inner closed-loop frame 72 also can be glued (i.e., adhesively mounted) to the bottom surface 311b of the movable barrel 31.

In assembly, the second resilient plate 70 is disposed on the loading plate 20, and the four third fixing portions 73 are aligned with the four corners of the loading plate 20, the movable barrel 31 is pressed on and glued with the second inner closed-loop frame 612. The coil 32 is wrapped around the outer wall of the movable barrel 31. The four magnetic elements 50 are received in the receiving spaces 317a formed by the movable barrel 31 and the inner sidewalls of the housing 10, and respectively pressed on the third fixing portions 73. The first resilient plate 60 is pressed on the movable barrel 31, and the locating holes 612a sleeve the locating pins 318 respectively to fix the first inner closed-loop frame 611 on the movable barrel 31. The second fixing portions 615 are pressed on and glued with the four magnetic elements 50. The housing 10 is covered on the loading plate 20, and is glued with the loading plate 20, and thus the four first fixing portions 111 firmly press the four second fixing portions 615 on the four magnetic elements 50.

In use, when an electric current is applied to the coil 32, the coil 32 is excited to act upon the magnetic elements 50, thereby receiving a magnetic force to drive the movable barrel 31 to linearly move along its central axis. When electric current is cut off from the coil 32, the first resilient plate 60 and the second resilient plate 70 impart a restoring force to the movable barrel 31, thereby returning the movable barrel 31 to its former position.

The protrusions 112 can prevent the movable barrel 31 and the first resilient plate 60 from moving out of the first accommodating room 201.

In other embodiments, the four protrusions 112 also can be formed with the movable barrel 31, and the number of the protrusions 112 is not limited to this embodiment.

In other embodiments, the bottom surface 311b also can position locating pins, and the shape of the second resilient plate 70 is same as that of the first resilient plate 60.

In other embodiments, the numbers of the first fixing portions 111, the second fixing portions 615 and the third fixing portions 73 also is not limited to this embodiment.

In other embodiments, one of the first resilient plate 60 or the second resilient plate 70 also can be omitted.

In other embodiments, the numbers of the locating pins 318 and the locating holes 612a are not limited to this embodiment.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A lens actuator comprising:
   a loading plate;
   a housing covering on the loading plate to form a first accommodating room therebetween, the housing comprising a top panel having at least two first fixing portions;
   a movable unit movably received in the first accommodating room;
   at least two magnetic elements received in the first accommodating room, spatially corresponding to the at least two first fixing portions and fixed on inner sidewalls of the housing; and
   a first resilient plate positioned between the top panel and the movable unit, the first resilient plate comprising a first outer closed-loop frame, a first inner closed-loop frame and a plurality of spring parts interconnected between the first outer closed-loop frame and the first inner closed-loop frame, wherein the movable unit is fixed on the first inner closed-loop frame, the first outer closed-loop frame comprises at least two second fixing portions spatially corresponding to the at least two first fixing portions, the at least two first fixing portions are configured for pressing the at least two second fixing portions on the at least two magnetic elements and are located off the movement path of the movable unit along an axial direction of the first accommodating room.

2. The lens actuator of claim 1, wherein the movable unit comprises a movable barrel and a coil wrapping around the movable barrel.

3. The lens actuator of claim 2, wherein the movable barrel defines a second accommodating room coaxial with the first accommodating room, the second accommodating room is configured for receiving optical elements.

4. The lens actuator of claim 3, wherein the movable barrel comprises a base and a convex stage vertically protruding from the base, the base is adjacent to the loading plate, the convex stage is adjacent to the top panel and comprises a top surface, the convex stage comprises two locating pins protruding from the top surface around the second accommodating room, the first inner closed-loop frame defines two locating holes receiving the two locating pins.

5. The lens actuator of claim 1, wherein the top panel defines a first through hole and comprises at least two protrusions around the first through hole, the at least two protrusions are configured for preventing the movable unit from moving out of the first accommodating room, each of the at least two protrusions comprises a connecting portion and a bent portion, the connecting portion protrudes from the top panel, the bent portion extends from the connecting portion towards the center of the top panel.

6. The lens actuator of claim 1, wherein the lens actuator further comprises a second resilient plate positioned between the movable unit and the loading plate, the second resilient plate comprises a second outer closed-loop frame and a second inner closed-loop frame, the second outer closed-loop frame comprises at least two third fixing portions spatially corresponding to the at least two magnetic elements, and thus the at least two magnetic elements firmly press the at least two third fixing portions on the loading plate.

7. The lens actuator of claim 6, wherein the shape of the second resilient plate is the same as that of the first resilient plate.

8. The lens actuator of claim 1, wherein the housing is made of material which is attracted by the at least two magnetic elements.

* * * * *